United States Patent [19]
Ottino et al.

[11] Patent Number: 5,786,559
[45] Date of Patent: Jul. 28, 1998

[54] WELD-BRAZE PROCESS

[75] Inventors: Robert F. Ottino, Florence, Ky.; Vonne D. Linse, Columbus, Ohio

[73] Assignee: Meyer Tool, Inc., Cincinnati, Ohio

[21] Appl. No.: 544,185

[22] Filed: Oct. 17, 1995

[51] Int. Cl.$^6$ ............................................. B23K 26/00
[52] U.S. Cl. ........................... 219/121.64; 219/85.13
[58] Field of Search ........................... 219/85.12, 85.13, 219/85.14, 85.15, 121.63, 121.64, 86.1, 121.13, 121.14; 228/234.1, 231, 253, 255; 148/524, 525, 526, 527, 528

[56] References Cited

U.S. PATENT DOCUMENTS

| | | | |
|---|---|---|---|
| 3,496,324 | 2/1970 | Harper | 219/85.15 |
| 3,617,685 | 11/1971 | Brill-Edwards | 219/121.14 |
| 3,850,698 | 11/1974 | Mallozzi et al. | |
| 3,881,084 | 4/1975 | Baardsen | 219/121.64 |
| 4,188,419 | 2/1980 | Detert et al. | 148/526 |
| 4,212,900 | 7/1980 | Serlin | |
| 4,326,117 | 4/1982 | Kanne, Jr. et al. | |
| 4,358,512 | 11/1982 | Richter | |
| 4,375,377 | 3/1983 | Ohtani et al. | 148/661 |
| 4,398,659 | 8/1983 | Richter | |
| 4,504,007 | 3/1985 | Anderson, Jr. et al. | |
| 4,644,129 | 2/1987 | Miller | 219/121.63 |
| 4,661,677 | 4/1987 | La Rocca | 219/121.64 |
| 4,686,080 | 8/1987 | Hara et al. | |
| 4,691,093 | 9/1987 | Banas et al. | 219/121.63 |
| 4,795,876 | 1/1989 | Nustede et al. | 219/86.1 |
| 4,852,736 | 8/1989 | Kojima et al. | 206/328 |
| 5,017,170 | 5/1991 | Dougherty et al. | 219/85.13 |
| 5,155,326 | 10/1992 | Whims et al. | |
| 5,160,090 | 11/1992 | Friedrich et al. | |
| 5,289,967 | 3/1994 | Bampton et al. | |
| 5,302,802 | 4/1994 | Fujinaga et al. | 219/121.78 |
| 5,306,890 | 4/1994 | Minamida et al. | |
| 5,309,637 | 5/1994 | Moriarty | |
| 5,340,015 | 8/1994 | Hira et al. | 228/205 |
| 5,509,980 | 4/1996 | Lim | 219/121.64 |
| 5,554,837 | 9/1996 | Goodwater et al. | 219/121.63 |
| 5,603,853 | 2/1997 | Mombo-Caristan | 219/121.64 |

FOREIGN PATENT DOCUMENTS

| | | | |
|---|---|---|---|
| 60-257967 | 12/1985 | Japan | 219/121.14 |
| 63-215391 | 9/1988 | Japan | |
| 2-20676 | 1/1990 | Japan | |

Primary Examiner—Geoffrey S. Evans
Attorney, Agent, or Firm—Wood, Herron & Evans, LLP

[57] ABSTRACT

A weld-braze process is disclosed for forming high-strength metal joints using a localized heat source in combination with braze filler material. Braze filler material is sandwiched between the metal members to be joined at predetermined weld locations and the localized heat source is directed along one of the metal members in two offset passes at the predetermined weld locations to form a pair of parallel welds. The parallel welds form a pair of weld beads extending from one of the metal members through the braze filler material and into the other metal member with the braze filler material melting and forming a braze layer region intermediate the pair of weld beads to join the metal members. In one embodiment, the localized heat source comprises a computer numerically controlled laser energy beam. A method is disclosed for joining a cover sheet to a nozzle segment base in the manufacture of a high pressure nozzle segment for aircraft engines.

30 Claims, 2 Drawing Sheets

WELD-BRAZE PROCESS

FIELD OF THE INVENTION

The present invention relates generally to welding and brazing methods for joining metal members and, more particularly, to such methods utilizing a localized heat source in combination with braze filler material.

BACKGROUND OF THE INVENTION

Various welding and brazing methods have been disclosed in the past for forming high strength joints between metal members. In known welding processes, metal members to be joined have joint surfaces held in direct contact while a localized heat source, such as a resistance welder, electron beam or laser energy beam, for example, is used to weld the members together either at discrete locations or along a continuous, uninterrupted line.

In conventional brazing methods, braze filler material is shaped to the configuration of the joint to be formed and then placed between the metal members at the joint location. The temperature of the joint is raised to the flow temperature of the braze filler material and then reduced below the melting point to form the joint.

While known welding and brazing methods are suitable for many applications, it has been found that direct surface-to-surface welding of certain metal alloys causes weld region cracking when the metal alloys are joined by this process. More particularly, direct welding requires a high temperature to be applied at the weld, typically in the range of 2,500° to 3,000° F. for nickel base alloys, which causes annealing of the metal material affected by the intense heat. When dissimilar metal alloys are welded, for example, the process typically causes mixing of the dissimilar metal alloys in the weld pool. This mixing in the weld pool results in an alloy of reduced melting point material at the grain boundaries, particularly in the lower regions of the weld pool. During post weld stress relief treatment cracks may appear or become more pronounced due to stress or grain boundaries already weakened or precracked during the actual weld process. Moreover, with conventional brazing, it has been found that the braze filler material has a tendency to flow into undesirable areas during the brazing cycle.

These drawbacks are a special concern during the manufacture of high pressure nozzle segments for aircraft engines. Nozzle segments typically include components manufactured of dissimilar high-temperature and high-strength nickel superalloys and further include fine air passages for cooling of the nozzle segment during operation of the aircraft engine. As these air passages must remain clear, any braze material flowing into and blocking these passages after the brazing process requires time consuming and expensive rework of the nozzle segment. Moreover, any cracking in the weld region between the high pressure nozzle segment components jeopardizes the safe operation of the aircraft engine.

Accordingly, it is an object of the present invention to provide a method of joining metal members yielding a high strength joint with minimal susceptibility to cracking at the joint.

It is another object of the present invention to provide a such a method with improved control of braze filler material flow during the welding process.

SUMMARY OF THE INVENTION

To these ends, a method of joining two metal members at predetermined weld locations is disclosed using a localized heat source in combination with braze filler material. The braze filler material, such as braze foil, for example, is cut into strips and sandwiched between the two metal members to be joined at the predetermined weld locations. In one embodiment, the braze filler material is first tacked to one of the metal members and the other metal member is then tacked to the metal member and braze filler combination. In another embodiment, the braze filler material is clamped between the two metal members in a hold-down fixture.

The localized heat source is directed in two offset passes along one of the metal members at the predetermined weld locations to form a pair of parallel welds. In accordance with the invention, the parallel welds form a pair of weld beads extending from one of the metal members and penetrating through the braze filler material and into the other metal member. In this way, the braze filler material melts and forms a braze layer region between the pair of weld beads to increase the width of the joint. Preferably, the welded-brazed metal members are subjected to a post weld stress relief treatment to further improve the performance of the joint.

In a preferred embodiment, a CNC-controlled laser energy beam is used as the localized heat source to form a pair of overlapping welds. The laser energy beam has low heat inputs to minimize penetration of the weld beads into the one metal member. In this way, the size of the weld pool and the amount of alloying between the metal members is minimized to substantially reduce the potential for forming crack susceptible microstructures in the joint. Moreover, the braze filler material melts only in the immediate vicinity of the weld beads for improved control of the braze flow during the welding process.

BRIEF DESCRIPTION OF THE DRAWINGS

The accompanying drawings, which are incorporated in and constitute a part of this specification, illustrate an embodiment of the invention and, together with the general description of the invention given above and the detailed description of an embodiment given below, serve to explain the principles of the present invention.

DETAILED DESCRIPTION OF THE INVENTION

Figure 1:
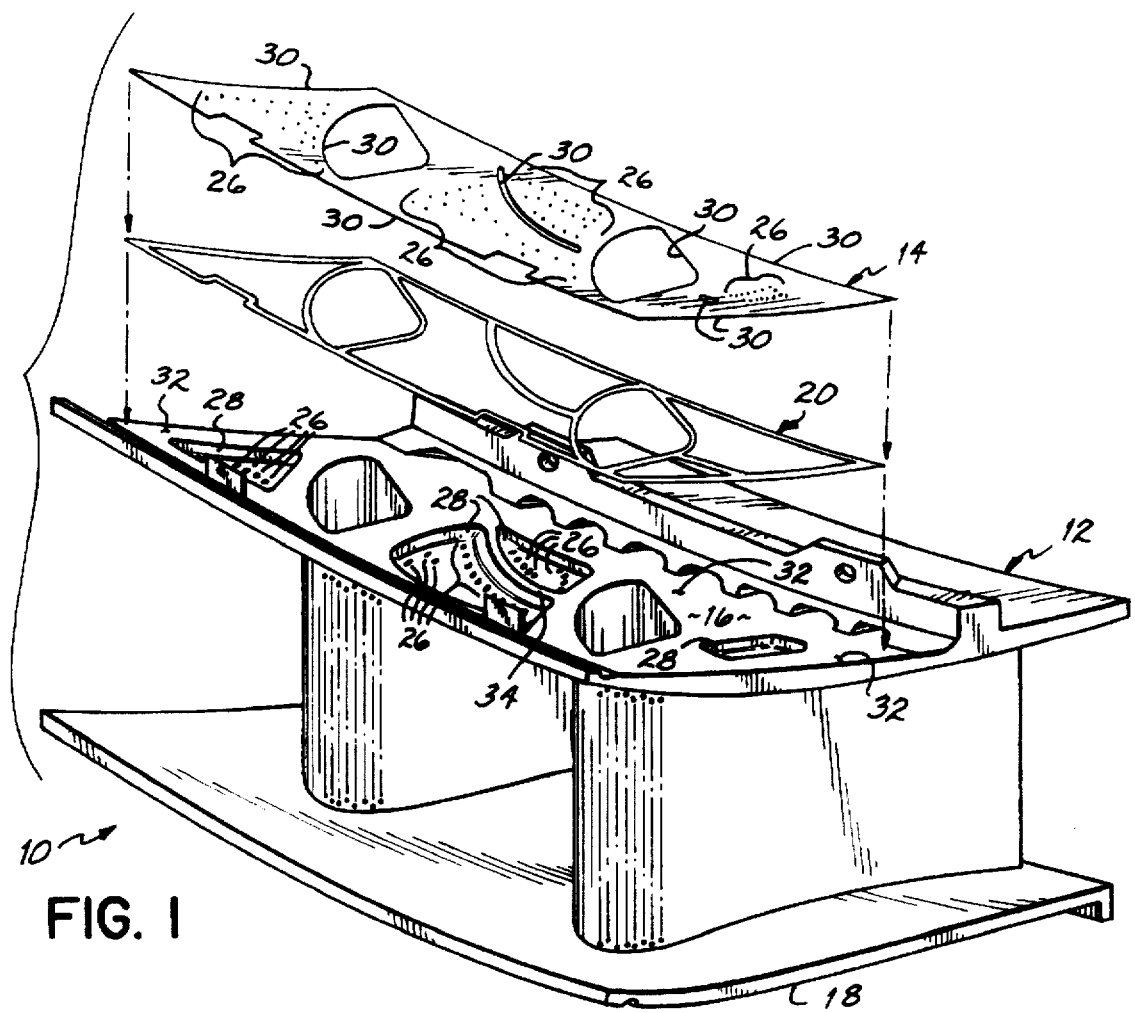
FIG. 1 is an exploded perspective view showing a high pressure nozzle segment prior to assembly.
Figure 2:
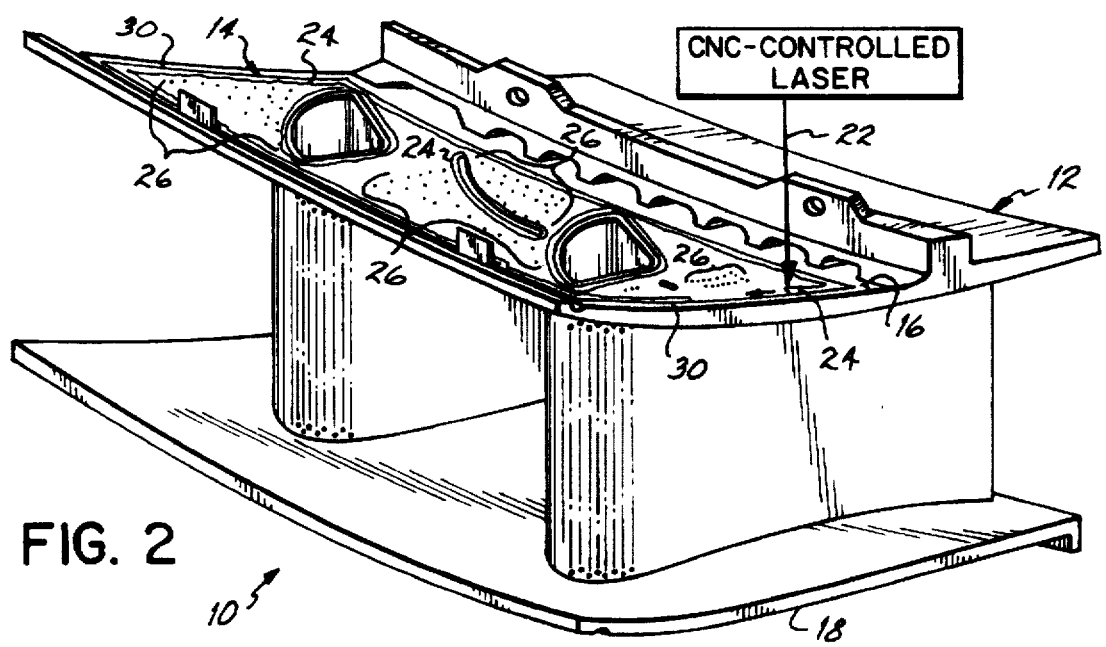
FIG. 2 is a perspective view showing diagrammatically the high pressure nozzle segment of FIG. 1 being assembled in accordance with the method of the present invention.

Referring now in detail to an exemplary embodiment shown in FIGS. 1 and 2, the method of the present invention is illustrated in the manufacture of a high pressure nozzle segment 10 for use in an aircraft engine. The high pressure nozzle segment 10 includes a nozzle segment base 12 and a pair of inner and outer cover sheets 14 (one shown) which are joined to the nozzle segment base at inner and outer surfaces 16 and 18, respectively, of the base 12. In accordance with the invention, braze filler material, shown diagrammatically as a layer at 20 in FIG. 1, is sandwiched intermediate the cover sheets 14 and the nozzle segment base 12 at predetermined weld locations. Preferably, a CNC-controlled laser energy beam 22 is used to form a pair of overlapping welds, shown diagrammatically at 24 in FIG. 2, at the predetermined weld locations to join the cover sheets 14 to the nozzle segment base 12 as will be described in more detail below.

With further reference to FIGS. 1 and 2, the nozzle segment base 12 and cover sheets 14 include fine air flow passages 26 in communication with compartments 28 of the nozzle segment base to provide necessary cooling for the high pressure nozzle segment 10 during operation of the aircraft engine. The cover sheets 14 include peripheral edges 30 which are joined in accordance with the invention to peripheral edges 32 and support risers 34 of the nozzle segment base 12. In one embodiment, the cover sheets 14 are manufactured of Inconel 625 metal alloy and the nozzle segment base 12 is manufactured of DSR 142 metal alloy. It will be appreciated that Inconel 625 and DSR 142 metal alloys are high-temperature and high-strength nickel super-alloys with superior metallurgical properties for aircraft engine applications. Those skilled in the art will recognize that while the present invention is shown and described herein in the manufacture of a high pressure nozzle segment 10, the method of the present invention is applicable to a broad range of applications requiring the formation of joints between similar or dissimilar metal members.

In accordance with the invention, the inner cover sheet 14 is joined to the inner surface 16 of the nozzle segment base 12 at predetermined weld locations defined by the peripheral edges 30 of the cover sheet 14 (see FIGS. 1 and 2). As shown in FIG. 1, the braze filler material 20, preferably "MET-GLAS" braze foil supplied by Allied Signal Corporation and cut into 0.125" wide strips, is sandwiched between the cover sheet 14 and the nozzle segment base 12 at the predetermined weld locations along the peripheral edges 30 and 32 of the cover sheet and nozzle segment base, respectively. According to AMS 4778F, a formula for braze filler material that offers the necessary properties is as follows: 92 Ni-4.5 Si-3.1 B. The liquidus state of this braze filler material is 1,900° F., and the solidus state is 1,800° F.

In one embodiment, the braze filler material 20 is first tacked to the nozzle segment base 12 at the predetermined weld locations through resistance welding, and the cover sheet 14 is then tacked to the nozzle segment base and braze filler material combination through resistance welding prior to the final welding step. In another embodiment, a fixture (not shown) is used to clamp the cover sheet 14, braze filler material 20 and nozzle segment base 12 combination prior to the final welding step. As shown in FIG. 2, the CNC-controlled laser energy beam 22 is preferably directed perpendicularly, in two parallel passes, offset by about 0.015", along the cover sheet 14 at the predetermined weld locations to form the pair of overlapping welds, shown diagrammatically at 24 in FIG. 2, for joining the cover sheets to the nozzle segment base. It will be appreciated that while only the inner cover sheet 14 is shown and described with reference to FIGS. 1 and 2, an outer cover sheet (not shown) is similarly joined to the outer surface 18 of the nozzle segment base 12.

Figure 3:
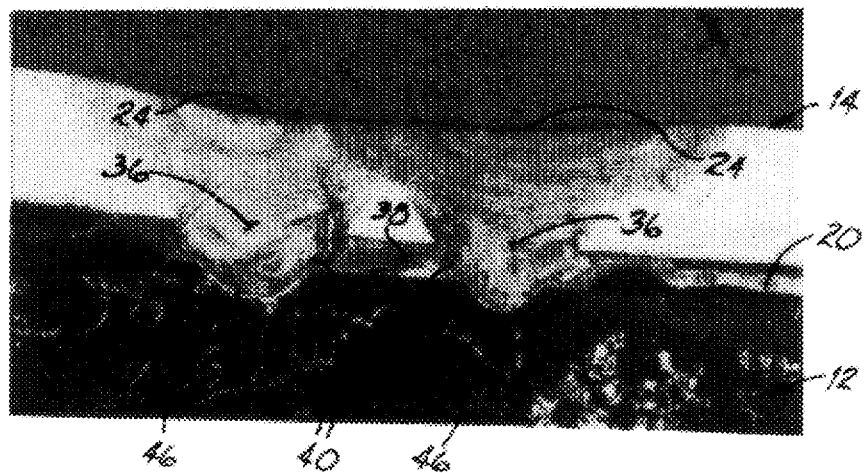
FIG. 3 is a metallographic sectional photograph (50×) of a high pressure nozzle segment showing a laser weld-braze joint between a cover sheet and a nozzle segment base in accordance with the method of the present invention.
Figure 4:
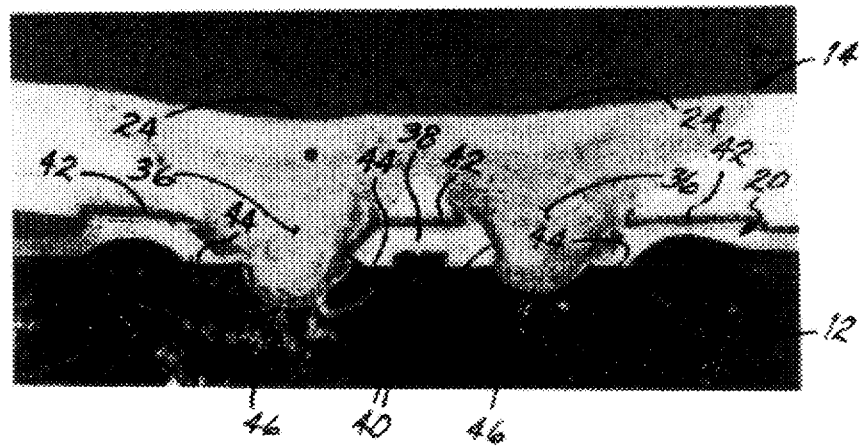
FIG. 4 is a metallographic sectional photograph (50×) of a laser weld-braze joint similar to FIG. 3 after being subjected to a post weld stress relief treatment.
Figure 5:
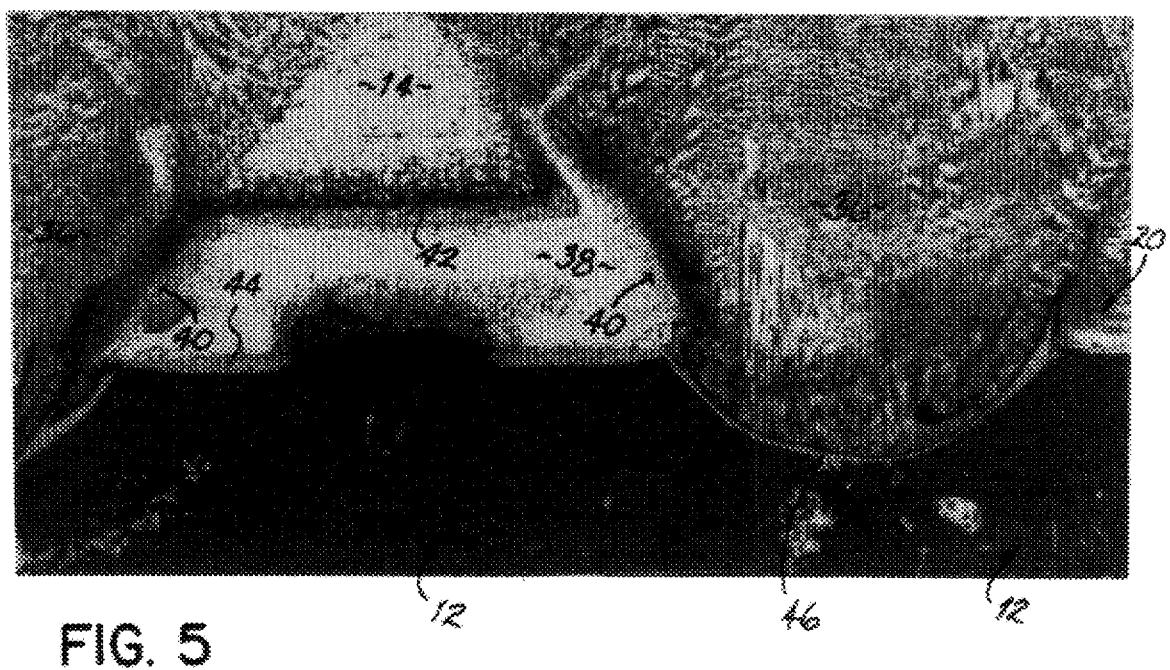
FIG. 5 is a metallographic sectional photograph (200×) of the laser weld-braze joint of FIG. 4 showing a braze layer region intermediate a pair of weld beads in accordance with the method of the present invention.

Referring to FIGS. 3-5, the overlapping welds 24 preferably form a pair of weld beads 36 extending from the cover sheet 14 and penetrating through the braze filler material 20 and into the nozzle segment base 12 to join the cover sheets to the nozzle segment base. In this way, a continuous braze layer region 38 is formed intermediate the pair of weld beads 36 as the braze filler material 20 melts out from edges 40 of the weld beads to increase the width of the joint. In a preferred embodiment, the welded high pressure nozzle segment 10 is subjected to a 1,650° F. post weld stress relief treatment, resulting in diffusion layers 42 and 44 at the interfaces of the cover sheet 14 and the nozzle segment base 12 with the braze filler material 20, respectively, as shown in FIGS. 4 and 5. In one embodiment, the cover sheet 14 has a thickness of about 0.020", and the pair of weld beads 36 have roots 46 extending into the nozzle segment base 12 in a range between about 0.003" and about 0.005".

It will be appreciated that the cover sheets 14 are thus joined to the inner and outer surfaces 16 and 18, respectively, of the nozzle segment base 12 without the braze filler material 20 wetting and blocking the fine air passages 26 of the high pressure nozzle segment 10.

OPERATING EXAMPLE

As shown in FIGS. 3-5, a strip of "METGLAS" braze foil 20 was first tacked to a DSR 142 metal alloy segment 12 using a Hughes Resistance Welder Model 250B set at 15 watt seconds, short pulse. An Inconel 625 metal alloy segment 14 having a thickness of about 0.020" was tacked to the DSR 142 metal alloy segment 12 and "METGLAS" braze foil 20 combination using the Hughes Resistance Welder set at 55 watts. A CNC-controlled laser energy beam, set at E1.8 R40 L3.5 F10 FL4.850 Gas 30 SCFH Argon, was directed perpendicularly to the Inconel 625 metal alloy segment 14 in two parallel passes, offset by about 0.01 5", to form a pair of overlapping welds 24. It was observed that a pair of weld beads 36 were formed extending from the Inconel 625 metal alloy segment 14 and penetrating through the "METGLAS" braze foil 20 and into the DSR 142 metal alloy segment 12 approximately 0.003"to 0.005". A continuous braze layer region 38 was formed between the pair of weld beads 36. It will be appreciated by those skilled in the art that the physical parameters of the weld-braze operation will vary for different metal and braze alloy configurations. The welded Inconel 625 and DSR 142 metal alloy segments 14 and 12 were subjected to a 1,650° F. post weld stress relief treatment and it was observed that diffusion layers 42 and 44 were formed at the interfaces between the Inconel 625 and DSR 142 metal alloy segments and the "MET-GLAS" braze foil 20, respectively, as shown in FIGS. 4 and 5. The as-welded Inconel 625 and DSR 142 metal alloy segments 14 and 12 were metallographically inspected at 400×, and good fusion, complete penetration and no cracks were indicated. The Inconel 625 and DSR 142 metal alloy segments 14 and 12 were subjected to peel testing after the post stress relief treatment and it was observed that failure typically occurred through the Inconel 625 metal alloy sheet at the outer edge of the weld-braze zone.

While the present invention has been illustrated by description of various embodiments and while those embodiments have been described in considerable detail, it is not the intention of applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made without departing from the spirit or scope of applicants' invention.

Having described the invention, we claim:

1. A method of joining two metal members, the steps comprising:

overlapping first and second metal members to be joined at predetermined weld locations;

sandwiching braze filler material intermediate said first and second metal members between said predetermined weld locations; and applying localized heat in two offset passes at said predetermined weld locations to form a pair of parallel welds, said welds forming a pair of weld beads extending from one of said metal members and penetrating through said braze filler material and into said other metal member whereby said braze filler material melts and forms a continuous braze layer region intermediate said pair of weld beads, said first and second metal members thereby being joined by said pair of parallel welds and said continuous braze layer region formed intermediate said pair of weld beads.

2. The method of claim 1 wherein the step of applying localized heat comprises directing a laser energy beam along one of said metal members to form said weld.

3. The method of claim 2 wherein said laser energy beam is directed by a computer numerically-controlled machine.

4. The method of claim 1 wherein said braze filler material comprises brazing foil.

5. The method of claim 1 wherein the step of sandwiching said braze filler material intermediate said first and second metal members includes the step of clamping said first and second metal members and braze filler material combination in a fixture.

6. The method of claim 1 further comprising the step of subjecting said joined first and second metal members to a post weld stress relief annealing treatment.

7. The method of claim 1 wherein the step of sandwiching said braze filler material intermediate said first and second metal members includes the steps of:

tacking said braze filler material to one of said metal members; and tacking said other metal member to said one metal member and braze filler material combination.

8. A method of joining two metal members, the steps comprising:

overlapping first and second metal members to be joined at predetermined weld locations;

sandwiching braze filler material intermediate said first and second metal members between said predetermined weld locations; and applying localized heat in two offset passes at said predetermined weld locations to form a pair of parallel, overlapping welds, said welds forming a pair of weld beads extending from one of said metal members and penetrating through said braze filler material and into said other metal member whereby said braze filler material melts and forms a continuous braze layer region intermediate said pair of weld beads, said first and second metal members thereby being joined by said pair of parallel welds and said continuous braze layer region formed intermediate said pair of weld beads.

9. The method of claim 8 wherein the step of sandwiching said braze filler material intermediate said first and second metal members includes the step of clamping said first and second metal members and braze filler material combination in a fixture.

10. The method of claim 9 wherein the step of applying localized heat comprises directing a laser energy beam along one of said metal members to form said pair of parallel welds.

11. The method of claim 10 wherein said laser energy beam is directed by a computer numerically controlled machine.

12. The method of claim 8 wherein said braze filler material comprises brazing foil.

13. The method of claim 8 further comprising the step of subjecting said joined first and second metal members to a post weld stress relief annealing treatment.

14. The method of claim 8 wherein the step of sandwiching said braze filler material intermediate said first and second metal members includes the steps of:

tacking said braze filler material to one of said metal members; and tacking said other metal member to said one metal member and braze filler material combination.

15. The method of claim 14 wherein the step of tacking said braze filler material to one of said metal members comprises resistance welding.

16. The method of claim 15 wherein the step of tacking said other metal member to said one metal member and braze filler material combination comprises resistance welding.

17. A method of joining two metal members, the steps comprising:

overlapping first and second metal members to be joined at predetermined weld locations;

sandwiching braze filler material intermediate said first and second metal members between said predetermined weld locations;

directing a laser energy beam along one of said metal members in two offset passes at said predetermined weld locations to form a pair of parallel, overlapping welds, said welds forming a pair of weld beads extending from one of said metal members and penetrating through said braze filler material and into said other metal member whereby said braze filler material melts and forms a continuous braze layer region intermediate said pair of weld beads; and subjecting said joined first and second metal members to a post weld stress relief annealing treatment, said first and second metal members thereby being joined by said pair of parallel welds and said continuous braze layer region formed intermediate said pair of weld beads.

18. The method of claim 17 wherein said laser energy beam is directed by a computer numerically controlled machine.

19. The method of claim 17 wherein said braze filler material comprises brazing foil.

20. The method of claim 17 wherein the step of sandwiching said braze filler material intermediate said first and second metal members includes the steps of:

tacking said braze filler material to one of said metal members; and tacking said other metal piece to said one metal member and braze filler material combination.

21. The method of claim 17 wherein the step of sandwiching said braze filler material intermediate said first and second metal members includes the step of clamping said first and second metal members and braze filler material combination in a fixture.

22. In the manufacture of a high pressure nozzle segment, the method of joining a cover sheet to a nozzle segment base comprising:

providing a nozzle segment base;

providing a cover sheet to be joined to said nozzle segment base at predetermined weld locations;

sandwiching braze filler material intermediate said nozzle segment base and said cover sheet between said predetermined weld locations;

applying localized heat in two offset passes at said predetermined weld locations to form a pair of overlapping welds, said welds forming a pair of weld beads extending from said cover sheet and penetrating through said braze filler material and into said nozzle segment base whereby said braze filler material melts and forms a braze layer region intermediate said pair of weld beads to join said cover sheet and nozzle segment base; and subjecting said joined cover sheet and nozzle segment base to a post weld stress relief annealing treatment.

23. The method of claim 22 wherein the step of applying localized heat comprises directing a computer numerically controlled laser energy beam along said cover sheet to form said pair of overlapping welds.

24. The method of claim 22 wherein said cover sheet has a thickness of about 0.020".

25. The method of claim 24 wherein said pair of weld beads extends into said nozzle segment base in a range between about 0.003" and about 0.005".

26. The method of claim 25 wherein said pair of weld beads are offset by about 0.015".

27. The method of claim 22 wherein said braze filler material comprises brazing foil.

28. The method of claim 27 wherein said brazing foil has a strip width of about 0.125".

29. The method of claim 22 wherein said step of sandwiching said braze filler material intermediate said nozzle segment base and said cover sheet includes the steps of:

tacking said braze filler material to said nozzle segment base; and tacking said cover sheet to said nozzle segment base and braze filler material combination.

30. The method of claim 22 wherein the step of sandwiching said braze filler material intermediate said nozzle segment base and said cover sheet includes the step of clamping said nozzle segment base, cover sheet and braze filler material combination in a fixture.

* * * * *